United States Patent [19]
Burleigh

[11] Patent Number: 5,914,662
[45] Date of Patent: Jun. 22, 1999

[54] CIRCUIT AND METHOD FOR INDICATING THE REMAINING SUPPRESSING CAPACITY OF A MULTIPLE-ELEMENT TRANSIENT-VOLTAGE PROTECTION DEVICE

[75] Inventor: Roger S. Burleigh, Dallas, Tex.

[73] Assignee: Current Technology, Inc., Irving, Tex.

[21] Appl. No.: 09/012,865

[22] Filed: Jan. 23, 1998

[51] Int. Cl.⁶ .................................................. G08B 21/00
[52] U.S. Cl. ..................... 340/635; 361/111; 361/119; 361/127
[58] Field of Search ............................. 361/91, 56, 111, 361/119, 118; 340/635, 659, 660

[56] References Cited

U.S. PATENT DOCUMENTS

| | | | |
|---|---|---|---|
| 4,152,743 | 5/1979 | Comstock | 361/56 |
| 5,153,806 | 10/1992 | Corey | 361/56 |
| 5,412,526 | 5/1995 | Kapp et al. | 361/56 |
| 5,748,093 | 5/1998 | Swanson et al. | 361/119 |

*Primary Examiner*—Sally C Medley
*Attorney, Agent, or Firm*—Burleigh & Associates

[57] ABSTRACT

A suppressing capacity circuit for use with a transient voltage protection device; the transient voltage protection device includes a plurality of series-coupled current-limiting elements and transient-suppressing elements couplable between first and second electrical conductors to suppress transient voltages therebetween, the current-limiting elements being adapted to open-circuit upon the failure of a transient-suppressing element coupled in series therewith. The suppressing capacity circuit includes: detection circuitry, coupled to each of the series-coupled current-limiting elements and transient-suppressing elements, that individually senses the open-circuit status of each of the current-limiting elements and provides an electrical characteristic that is a function of the number of the current-limiting elements which have not open-circuited; comparison circuitry, coupled to the detection circuitry, that compares the electrical characteristic to a reference and generates a signal that is a function of the ratio of the electrical characteristic to the reference; and alerting circuitry, coupled to the comparison circuitry, that receives the signal generated by the comparison circuitry and provides an indication of the ratio, the remaining suppressing capacity of the transient voltage protection device being a function of the ratio.

55 Claims, 3 Drawing Sheets

Fig. 4

CIRCUIT AND METHOD FOR INDICATING THE REMAINING SUPPRESSING CAPACITY OF A MULTIPLE-ELEMENT TRANSIENT-VOLTAGE PROTECTION DEVICE

TECHNICAL FIELD OF THE INVENTION

The present invention is directed, in general, to transient voltage protection systems and, more specifically, to a circuit and method, adapted for use with transient-voltage suppression devices employing metal oxide varistors ("MOVs") or other voltage-sensitive, transient-suppressing elements, for indicating the remaining suppressing capacity of a multiple-element transient-voltage protection device.

BACKGROUND OF THE INVENTION

For many years, manufacturers of sensitive electronic systems have recommended that users take measures to isolate their hardware from transient overvoltages (also called "surges") that may cause damage. Transient voltage protection systems (so-called "surge suppressors") are designed to reduce transient voltages to levels below hardware-damage susceptibility thresholds, which can be achieved through the use of various types of transient-suppressing elements coupled between the phase, neutral and/or ground conductors of an electrical distribution system.

Conventional transient-suppressing elements typically assume a high impedance state under normal operating voltages. When the voltage across a transient-suppressing element exceeds a predetermined threshold rating, however, the impedance of the element drops dramatically, essentially short-circuiting the electrical conductors and "shunting" the current associated with the transient voltage through the element and thus away from the sensitive electronic hardware to be protected.

To be reliable, a transient-suppressing element itself must be capable of handling many typical transient-voltage disturbances without internal degradation. This requirement dictates the use of heavy-duty components designed for the particular transient voltage environment in which such elements are to be used. In environments characterized by high-magnitude or frequently-occurring transients, multiple transient-suppressing elements may be required.

In many applications, the transient-suppressing elements typically employed are metal-oxide varistors ("MOVs"). When designing a system incorporating MOVs it is important to recognize the limitations of such devices, and the effects that the failure of any given MOV may have on the integrity of the total system. All MOV components have a maximum transient current rating; if the rating is exceeded, the MOV may fail. An MOV component may also fail if subjected to repeated operation, even if the maximum transient current rating is never exceeded. The number of repeated operations necessary to cause failure is a function of the magnitude of transient current conducted by an MOV during each operation: the lower the magnitude, the greater the number of operations necessary to cause failure. A designer of transient voltage protection systems must consider these electrical environment factors when selecting the number and type of MOVs to be used in a particular system.

Therefore, to design a reliable transient voltage suppression system, a designer must consider both the maximum single-pulse transient current to which the system may be subjected, as well as the possible frequency of transients having lower-level current characteristics. Although individual MOVs have a maximum transient current rating, it is possible to construct a device using multiple MOVs, in parallel combination, such that the MOVs share the total transient current. In this manner, each individual MOV must only conduct a fraction of the total transient current, thereby reducing the probability that any individual MOV will exceed its rated maximum transient current capacity. Furthermore, by using a plurality of individual MOVs, a transient voltage protection system can withstand a greater number of operations, because of the lower magnitude of transient current conducted by each individual MOV.

When a transient voltage suppression system incorporates multiple MOVS, it is important that the system be designed such that the failure of an individual MOV does not cause a complete loss of system functionality. When an MOV fails, due to either exceeding its maximum transient current rating or frequent operation, it initially falls into a low impedance state, drawing a large steady-state current from the electrical distribution system. This current, if not interrupted, will quickly drive an MOV into thermal runaway, typically resulting in an explosive failure of the MOV.

To avoid the explosive failure of MOVs, an appropriately-rated current-limiting element, such as a fuse, should be employed in series with MOVs. If the transient-suppressing device incorporates a plurality of MOVs, however, a single fuse in series with a parallel combination of MOVs may open-circuit even if only a single MOV fails, resulting in a disconnection of the remaining functional MOVs from the electrical distribution system. Therefore, better-designed systems incorporate individual fuses for each MOV, such that the failure of an individual MOV will result only in the opening of the fuse coupled in series with the failed MOV; the remaining functional MOVs remain connected to the electrical distribution system, via their own fuses, to provide continued transient voltage protection.

In the prior art there are circuits that incorporate a plurality of MOVs with an individual fuse provided for overcurrent protection of the MOVs, and with monitoring means provided to indicate the status of the fuse. U.S. Pat. No. 5,153,806 to Corey teaches the use of a single fuse to protect a plurality of MOVs, as well as an alarm circuit for indicating when the fuse has open-circuited. Similarly, U.S. Pat. No. 4,152,743 to Comstock teaches the use of a single fuse in series with a plurality of MOVs, as well as a light-emitting diode ("LED"), coupled in parallel with the fuse, to emit light when the fuse is blown.

The inadequacy of the prior art is that the failure of a single MOV component may cause the fuse in series with the plurality of MOVs to open-circuit, thus defeating the entire system and, therefore, all transient voltage suppression. Although the prior art teaches many methods of monitoring the status of an individual fuse, it fails to teach a method for monitoring the status of multiple fuses by means of a single display.

In U.S. Pat. No. 5,412,526, issued May 2, 1996, to Kapp, et al., a surge arrestor circuit having a plurality of MOVs with a fuse connected in series with each MOV is disclosed. The disclosed device further includes a circuit for "monitoring the status condition of the fuses." The circuit disclosed, however, employs only a single LED, the intensity of which "decreases slightly when a fuse opens up;" "when only a preselected number of varistor and fuse pairs remain operational, the [LED] will extinguish entirely to signal for replacement of the surge arrestor." Thus, it is apparent that while the circuit disclosed by Kapp can indicate when a preselected number of varistors have failed, or fuses have open-circuited, it is incapable of indicating the remaining suppressing capacity of the device over the complete operational range of the device; i.e., over the range of zero to 100%. The circuit disclosed by Kapp, therefore, only provides a useful indication to a user if the preselected number of fuses have open-circuited; i.e., a user of the device cannot determine whether the suppressing capacity of the device is less than the full, original capacity until the preselected number of MOVs have failed. This is undesirable since a user cannot determine at what rate the MOVs within the device are failing, or how much suppressing capacity remains in the device until all, or substantially all, of the transient-voltage protection provided by the device is lost, at which time sensitive electronic systems to be protected by the device are subject to damage or failure due to subsequent transient voltages.

Therefore, what is needed in the art are circuits and methods for indicating the remaining suppressing capacity of a multiple-element transient-voltage protection device; the circuits and method should preferably provide an indication of the remaining suppressing capacity over the range of zero to 100%. Furthermore, there is a need in the art for circuits and methods that allow a user of a transient voltage protection device to determine the rate at which transient-suppressing elements within the device are failing, whereby the user can make an informed decision regarding the need for repair or replacement and whether the transient-voltage protection device should be replaced with a device having a greater capacity than the failed device.

SUMMARY OF THE INVENTION

To address the above-discussed deficiencies of the prior art, it is a primary object of the present invention to provide a circuit and method for indicating the remaining suppressing capacity of a multiple-element transient-voltage protection device.

In the attainment of the above primary object, the present invention provides a suppressing capacity circuit, and method thereof, for use with a transient voltage protection device, and devices and systems employing the suppressing capacity circuit and method; the transient voltage protection device includes a plurality of series-coupled current-limiting elements and transient-suppressing elements couplable between first and second electrical conductors to suppress transient voltages therebetween, the current-limiting elements being adapted to open-circuit upon the failure of a transient-suppressing element coupled in series therewith. The suppressing capacity circuit includes: detection circuitry, coupled to each of the series-coupled current-limiting elements and transient-suppressing elements, that individually senses the open-circuit status of each of the current-limiting elements and provides an electrical characteristic that is a function of the number of the current-limiting elements which have not open-circuited; comparison circuitry, coupled to the detection circuitry, that compares the electrical characteristic to a reference and generates a signal that is a function of the ratio of the electrical characteristic to the reference; and alerting circuitry, coupled to the comparison circuitry, that receives the signal generated by the comparison circuitry and provides an indication of the ratio, the remaining suppressing capacity of the transient-voltage protection device being a function of the ratio.

For purposes of the present invention, "electrical characteristic" is defined, without limitation, as a variable voltage or resistance capable of indicating whether one or more of the current-limiting elements associated with the transient suppressing elements has open-circuited. Of course, those of ordinary skill in the pertinent art will understand that other electrical characteristics may be detected to provide an indication of proper functioning of the current-limiting or transient-suppressing elements; other such characteristics are certainly within the scope of the present invention. In addition, for purposes of the present invention, the term "reference" is defined, without limitation, as a voltage or resistance that can be "compared" with the "electrical characteristic;" e.g., if the electrical characteristic is a voltage, the reference is preferably a voltage, and if the electrical characteristic is a resistance, the reference is preferably a resistance. Furthermore, use of the word "compare," and derivatives thereof, is broadly defined to include the addition, subtraction, multiplication, and/or division of two values, e.g., the ratio (i.e., division) of two resistances.

In one embodiment, the detection circuitry includes a plurality of resistors having the first terminals of each resistor coupled intermediate to each of the series-coupled current-limiting elements and transient-suppressing elements, the second terminals of each of the plurality of resistors being coupled together to form a common node. Because the first terminals of each resistor are coupled, via the current-limiting elements, to the first electrical conductor, the first electrical conductor forms a second common node for the plurality of resistors; i.e., the resistors form a resistance "ladder" between the common nodes. When a transient-suppressing element fails, causing the current-limiting element coupled in series therewith to open-circuit, the resistor coupled to the open-circuited fuse is removed from the resistance ladder; removing a resistor from the resistance ladder has the effect of increasing the equivalent resistance of the resistance ladder. The detection circuitry is thus capable of individually sensing the open-circuit status of each of the current-limiting elements by the change in equivalent resistance associated with the open-circuiting of a current-limiting element. The detection circuitry thereby provides an electrical characteristic, e.g., the equivalent resistance of the resistance ladder, that is a function of the number of the transient-suppressing elements which have not failed.

In one embodiment, the electrical characteristic provided by the detection circuitry is a voltage between the common node of the plurality of resistors (i.e., the resistance ladder) and the second electrical conductor. As described in detail hereinafter, a resistor having a known value may be coupled between the common node and the second electrical conductor, whereby the resistance ladder and the resistor having a known value form a voltage divider between the first and second electrical conductors. The voltage across the resistor having a known value is a function of the number of resistors remaining in the resistance ladder, which is equal to the number of current-limiting elements which have not open-circuited due to the failure of the transient-suppressing element associated therewith. In one embodiment, the comparison circuit compares the voltage across the resistor having a known value to the voltage between the first and second electrical conductors, which may serve as a reference voltage, the ratio of the two voltages being a function of the remaining suppressing capacity of the device.

In a preferred embodiment, the electrical characteristic provided by the detection circuitry is a measure of the resistance between the first electrical conductor and the common node of the plurality of resistors; i.e., the magnitude of the resistance is equal to the parallel combination of the values of the individual resistors comprising the ladder of resistors, defined herein as the "equivalent resistance."

Those skilled in the art will recognize that as individual current-limiting elements open-circuit due to the failure of associated transient-suppressing elements, resistors are removed from the resistance ladder, thereby increasing the equivalent resistance of the parallel-coupled resistors of the resistance ladder. In one embodiment, the comparison circuit compares the equivalent resistance with a resistor having a known value (i.e., a "reference," or "standard," resistance), the ratio of the two resistances being a function of the remaining suppressing capacity of the device.

In one embodiment, the "transient-suppressing elements" are metal oxide varistors ("MOV"), which are coupled in parallel, via the "current-limiting elements," between the first and second electrical conductors; the total suppressing capacity of a device being equal to the sum of the suppressing capacities of the individual MOVs. As those skilled in the pertinent art understand, MOVs are frequently employed to advantage in voltage transient suppression systems. Other devices, however, such as silicon avalanche diodes, may be more useful in some specialized applications; the broad scope of the present invention includes all such devices or components. Because the loss of any single MOV results in diminished transient-voltage suppressing capacity, it is important for a system user to be able to monitor the remaining suppressing capacity. The user may then use this information to determine when it is desirable or necessary to repair or replace the device.

In one embodiment, the "current-limiting elements" are fuses. Generally, when MOVs fail, they initially go into a very-low-resistance state and draw large currents from the power distribution system until the device overheats and ruptures, often explosively. To avoid such explosive failures, fuses may be employed in series with MOVs; fuses are adaptable to open-circuit and thus limit the large currents potentially drawn through an MOV upon its failure. As those skilled in the art will recognize, other current-limiting devices, such as circuit breakers, may be employed in specific applications; such applications are within the scope of the claims recited hereinafter.

The invention further includes alerting circuitry for providing an indication of the remaining suppressing capacity of the transient voltage protection device. Preferably, the alerting circuitry provides the system user with a useful indication of the remaining effectiveness of the device, allowing the user to judge whether or when to replace the device; prior art devices either fail to give such indication, or give an all-or-nothing indication that fails to provide sufficient information to the system user. In one embodiment, the alerting circuitry includes display circuitry adapted to provide a visual indicator of the remaining capacity. In a related embodiment, the display is a liquid crystal display (LCD) that displays the remaining capacity as a percentage; e.g., if the device includes ten transient-suppressing elements, a display reading of "70%" indicates that three of the elements have failed. Those skilled in the art will readily perceive of other means for alerting a user to the remaining capacity, including audible alarms and automatic failure-detection system operable under the control of a general purpose computer; devices employing the principles of the present invention and such alerting means are within the scope of the claims recited hereinafter.

In one embodiment, the suppressing capacity circuit further includes an isolated power supply; those skilled in the art are familiar with the problems that may arise if testing and measurement equipment is not electrically-isolated from the electrical device being tested. In one embodiment, the isolated power supply is electrically-isolated from the first and second electrical conductors between which the transient voltage protection device is coupled and provides power to the comparison circuitry and the alerting circuitry. In a related embodiment, the isolated power supply is a battery; a battery operated suppressing capacity circuit has the advantage of easy portability, allowing a user to purchase only one testing apparatus that may be used with many transient-voltage protection devices.

In one embodiment of the present invention, a system for suppressing transient voltages occurring on any pair of a plurality of electrical conductors is provided. Thus, the present invention may be employed to advantage with either single-phase or multi-phase electrical distribution systems having any combination of phase, neutral and ground conductors.

The foregoing has outlined rather broadly the features and technical advantages of the present invention so that those skilled in the art may better understand the detailed description of the invention that follows. Additional features and advantages of the invention will be described hereinafter that form the subject of the claims recited hereinafter. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
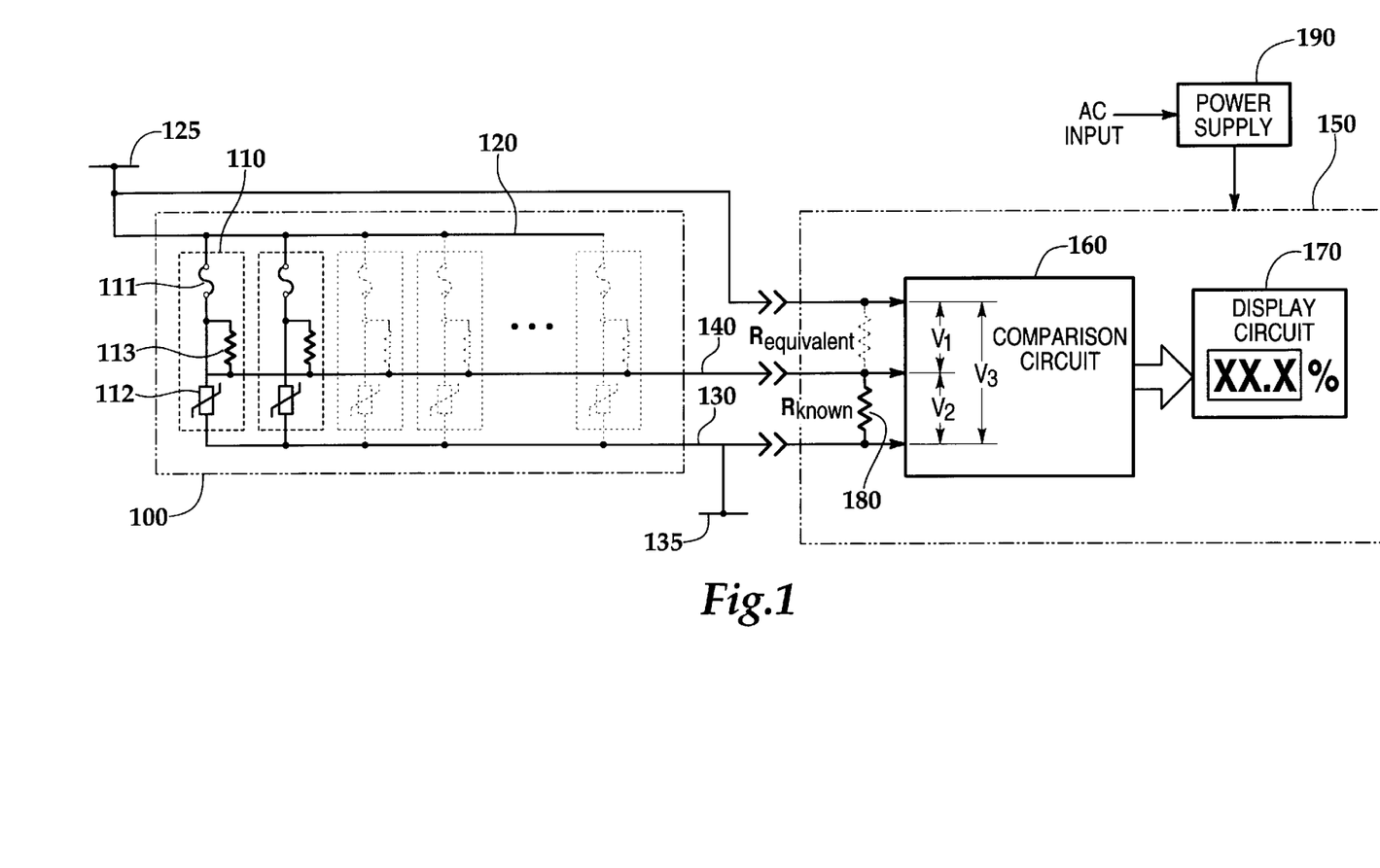
FIG. 1 illustrates an exemplary transient voltage protection device and a first exemplary embodiment of the suppressing capacity circuit in accordance with the principles of the present invention.

Referring initially to FIG. 1, illustrated is an exemplary transient-voltage protection device 100 and a first exemplary suppressing capacity circuit 150 in accordance with the principles of the present invention. The transient-voltage protection device 100 includes a plurality of parallel-coupled circuits, generally designated 110, each of which includes a current-limiting element 111 and a transient-suppressing element 112. Those skilled in the art will readily appreciate that the transient-voltage protection device 100 may have any desired number of the parallel-coupled circuits 110, and that the total transient-suppressing capacity of the transient-voltage protection device 100 is a function of the number of parallel-coupled circuits 110.

In the exemplary embodiment, the current-limiting elements 111 are fuses and the transient-suppressing elements 112, which are each coupled in series with a fuse 111, are metal oxide varistors ("MOV"). Each series-coupled fuse 111 and MOV 112 is coupled between a buss 120 and a buss 130. The buss 120 is coupled to a first electrical conductor 125 of a power distribution system (not shown); the buss 130 is coupled to a second electrical conductor 135 of the power distribution system. Thus, the MOVs 112 are electrically connected in parallel between the first and second electrical conductors 125, 135 of the power distribution system.

When exposed to a transient voltage occurring between the first and second electrical conductors 125, 135, the impedance of each MOV 112 changes by many orders of magnitude from a substantially high-impedance state to a very low impedance state, i.e., a highly conductive state, thereby "shunting" the current associated with the transient voltage through the MOV and thus away from the sensitive electronic hardware to be protected.

As those skilled in the art understand, when an MOV is subjected to a transient voltage beyond its peak current/energy rating, it initially fails in a short-circuit mode. An MOV may also fail when operated at a steady-state voltage well beyond its nominal voltage rating, or if subjected to repeated operations due to transient voltages having associated current levels below the peak current/energy rating for the MOV. When an MOV fails in the short-circuit mode, the current through the MOV becomes limited mainly by the source impedance of the power distribution system to which the MOV is coupled. Consequently, a large amount of energy can be introduced into the MOV, causing mechanical rupture of the package accompanied by expulsion of package material; this failure mode may be prevented by proper selection of a fuse that limits the current flowing through the failed MOV to a level below that which can cause the MOV package to rupture. Thus, the current-limiting element, fuse 111, is provided to interrupt current flow through the MOV at a level just below that which could cause a failure.

In the exemplary transient-voltage protection device 100, each parallel-coupled circuit 110 further includes a resistor 113 having a first terminal coupled intermediate to the fuse 111 and MOV 112; i.e., a first terminal of the resistor 113 is coupled to the electrical node formed by the series combination of fuse 111 and MOV 112. The second terminals of each resistor 113 are coupled together to form a common node, also referred to as "status conductor," 140. Those skilled in the art will recognize that, because the first terminal of each resistor 113 is coupled through its associated fuse 111 to the first electrical conductor 125, via the buss 120, the first electrical conductor forms a second common node for the plurality of resistors 113; i.e., the resistors 113 form a resistance "ladder" between the common nodes. When an MOV 112 fails, causing the fuse 111 coupled in series therewith to open-circuit, the resistor 113 coupled to the open-circuited fuse is removed from the resistance ladder; removing a resistor from the resistance ladder has the effect of increasing the equivalent resistance of the resistance ladder. The resistance ladder is thus capable of individually sensing, or "detecting," the open-circuit status of each of the fuses 111 through the change in equivalent resistance associated with the open-circuiting of any fuse 111. Thus, the resistance ladder is defined herein as "detection circuitry." Those skilled in the art, however, may conceive of other equivalent circuits for detecting the open-circuit status of fuses 111; such equivalent circuits are within the scope of the claims recited hereinafter.

The detection circuitry provides an "electrical characteristic," e.g., the equivalent resistance of the resistance ladder, that is a function of the number of fuses 111 that have not open-circuited due to the failure of one or more MOVs 112. If an MOV 112 fails, its failure causes the fuse 111 coupled in series with it to open-circuit. When a fuse 111 open-circuits, the resistor 113 associated therewith is no longer electrically coupled to buss 120, and is thus no longer in parallel combination with the similarly-connected resistors 113 in the other parallel-coupled circuits 110. If the ohmic value ($R_\Omega$) of all resistors 113 is equal, the parallel combination of these resistors has a total ohmic value, or "equivalent resistance," equal to $R_\Omega/n$, where n is equal to the total number of resistors 113. Thus, the effect of the open-circuiting of a fuse 111 is to increase the total ohmic value of the parallel combination of the resistors 111 in the detection circuitry. As additional MOV failures occur, the total ohmic value of the detection circuitry increases further until it reaches infinity when the last fuse 111 open-circuits. According to the principles of the present invention, a suppressing capacity circuit 150, which may include the detection circuitry as described hereinabove, is provided to allow a user to determine the remaining suppressing capacity of the transient-voltage protection device 100.

In the exemplary embodiment illustrated in FIG. 1, the suppressing capacity circuit 150 includes comparison circuitry 160 and alerting circuitry 170. The suppressing capacity circuit 150 further includes a resistor 180 that has a known value, also referred to as a "reference" or "reference resistor." The reference resistor 180 is electrically-coupled between the status conductor 140 and the second electrical conductor 135, resulting in a voltage divider circuit where the input voltage is equal to the voltage as measured between the first and second electrical conductors 125, 135, and the output voltage is the voltage between the status conductor 140 and the second electrical conductor 135; through the proper selection of ohmic values for the resistors 113 and the reference resistor 180, the output voltage can exhibit an approximately linear relationship to the number of the resistors 113 that remain electrically-connected through the fuses 111 to the first electrical conductor 125. As previously detailed, each resistor 113 remains electrically connected to the first electrical conductor 125 through its associated fuse 111, provided that the MOV 112 associated therewith has not failed. Therefore, the output voltage (i.e., the voltage between the status conductor 140 and the second electrical conductor 135) can be linearly related to the number of functioning MOVs remaining in the transient-voltage protection device 100.

As described hereinabove, the resistance of an MOV is very-high under normal operating conditions, but drops to a very-low value when exposed to a voltage above a certain threshold. When an MOV fails, it is common for the MOV to open-circuit, whereby its resistance is substantially infinite. In some cases, however, the MOV can fail to a non-open-circuit state, and can exhibit a continued low impedance. When a fuse 111 open-circuits due to the failure of its associated MOV 112, the MOV 112 and its associated resistor 113 will be coupled in series with each other; the series-coupled MOV 112 and resistor 113 will also be coupled in parallel with the reference resistor 180. Because the coupling of any resistance in parallel with the reference resistor 180 will effectively decrease the value of the reference (i.e., the equivalent resistance between the status conductor 140 and the second electrical conductor 135), those skilled in the art will recognize that proper selection of the values for resistors 113 and reference resistor 180 is necessary to insure proper operation. This is easily achieved, however, by selecting each resistor 113 to have a value significantly greater than the value of reference resistor 180; even if an MOV 112 fails to a low-impedance state, the series resistance of the MOV and its associated resistor 113 will be significantly greater than the value of the reference resistor 180 and will thus not significantly affect the equivalent resistance between the status conductor 140 and the second electrical conductor 135. Because a failed MOV 112 becomes coupled in series with its associated resistor 113, the selection of a large value for the resistors 113 will also reduce the power dissipation in, and/or further damage to, a failed MOV. Those skilled in the art will readily conceive of other circuits or methods for reducing, or eliminating, the problem associated with the variable resistance of failed MOVs, such as providing a diode in series with each resistor 113; all such circuits and methods are within the broad scope of the claims recited hereinafter.

An alternative embodiment of the present invention calls for the resistor 180 to be eliminated, with the status conductor 140 being electrically-coupled to the second electrical conductor 135. The current that flows in the status conductor 140 is equal to the voltage between the first and second electrical conductors 125 and 135, divided by the equivalent resistance of the parallel combination of resistances 113. The value of the current varies as a function of the number of fuses 111 that have not open-circuited due to the failure of an MOV associated therewith. Thus, it can be seen that the status conductor 140 can provide either a voltage or a current signal (i.e., an "electrical characteristic" as defined herein) to the suppressing capacity circuit 150.

In the exemplary suppressing capacity circuit 150, the comparison circuit 160 compares the electrical characteristic provided by the detection circuitry to a reference and generates a signal that is a function of the ratio of the electrical characteristic to the reference. In one embodiment, the reference is the voltage $V_2$ across the reference resistance 180 and the electrical characteristic is the voltage $V_1$ between the first electrical conductor 125 and the status conductor 140, which varies as a function of the value of the equivalent resistance. Those skilled in the art will note that the "$R_{equivalent}$" illustrated in FIG. 1 is not a physical resistance, but represents the equivalent resistance of the parallel combination of the resistors 113, which varies as function of the number of fuses 111 that have not open-circuited.

Those skilled in the art will recognize that the voltage $V_2$ across the reference resistor 180 will also vary as a function of the value of the equivalent resistance $R_{equivalent}$. It is preferable that the reference used by the comparison circuit 160 be relatively stable, and that only the electrical characteristic provided by the detection circuit vary as function of the remaining suppressing capacity of the transient-voltage protection device. Thus, in an alternative embodiment, the "electrical characteristic" is the voltage across the reference resistor 180 and the "reference" is the voltage $V_3$ between the first and second electrical conductors 125, 135. In this embodiment, as the voltage $V_3$ between the first and second electrical conductors fluctuates, so will the voltage $V_2$ across the reference resistor 180. The voltages $V_2$ and $V_3$ will, however, fluctuate up and down in phase with each other and, thus, the comparison circuit may provide a generally accurate indication of the remaining suppressing capacity of the transient-voltage protection device 100; a preferred embodiment disclosed hereinafter eliminates any problems associated with voltage fluctuations between the first and second electrical conductors 125, 135, as well as providing a circuit that does not depend upon the presence of a voltage between the first and second electrical conductors, thereby providing for the measurement of the suppressing capacity of a transient-voltage protection device coupled between neutral and ground conductors.

Those skilled in the art are familiar with various circuits for comparing two electrical characteristics, such as voltages, currents, or resistances. Thus, the scope of the present invention is not limited to a particular comparison circuit 160. The comparison circuit may be an analog circuit, employing such devices as differential amplifiers, or the comparison circuit 160 may be implemented as a digital circuit by using analog-to-digital converter circuits to convert the electrical characteristic provided by the detection circuit to a binary form suitable to the application of digital processing. In particular, if the comparison circuit 160 comprises a microprocessor, or other digital logic circuit, the "reference" may actually take the form of a lookup table of data that can be directly compared to the electrical characteristic provided by the detection circuitry. For example, a lookup table can cross-reference values of the voltage $V_2$ with pre-defined values for the remaining suppressing capacity of the transient-voltage protection device 100. Thus, even if the voltage $V_2$ varies non-linearly with the actual remaining suppressing capacity, the lookup table data can be selected so that the comparison circuit accurately determines the remaining suppressing capacity. Those skilled in the art may perceive of other equivalent circuits for performing the function of the comparison circuit 160; such equivalent circuits are within the broad scope of the claims recited hereinafter.

After comparing the electrical characteristic and the reference, the comparison circuitry 160 generates a signal that is a function of the ratio of the electrical characteristic and the reference, the remaining suppressing capacity of the transient-voltage protection device 100 being a function of the ratio. The signal provided by the comparison circuitry 160 to the alerting circuitry 170 may be either analog or digital as required by the alerting circuitry 170. The alerting circuitry 170 receives the signal from the comparison circuitry 160 and provides an indication of the remaining suppressing capacity of the transient-voltage protection device 100. Preferably, the alerting circuitry provides the system user with a useful indication of the remaining effectiveness of the device, allowing the user to judge whether or when to replace the device; prior art devices either fail to give such indication, or give an all-or-nothing indication that fails to provide sufficient information to the system user.

In one embodiment, the alerting circuitry 170 includes display circuitry adapted to provide a visual indication of the remaining capacity. Those skilled in the art are familiar with various types of visual indicators suitable for use with the present invention, such as a liquid crystal display (LCD) that displays the remaining suppressing capacity as a percentage; e.g., if the transient-voltage protection device 100 includes ten MOVs 112, a display reading of "70%" could indicate that three of the MOVs have failed.

The alerting circuitry 170 may take other various forms capable of indicating the remaining suppressing capacity of the transient-voltage protection device 100. For example, the alerting circuitry 170 may also incorporate an audible alarm; a fault management system may provide a means for switching to a redundant transient-voltage suppression system or module when the suppressing capacity of the transient-voltage protection device 100 falls below a predetermined threshold. Those skilled in the art will readily perceive of other means for alerting a user to the remaining capacity; devices employing the principles of the present invention and such alerting means are within the broad scope of the claims recited hereinafter.

In one embodiment, the suppressing capacity circuit 150 further includes a power supply 190. Those skilled in the art are familiar with the problems that may arise if testing and measurement equipment is not electrically-isolated from the electrical device being tested, such as transient-voltage protection device 100. Thus, in one embodiment, the power supply 190 is electrically-isolated from the first and second electrical conductors 125, 135 between which the transient-voltage protection device 100 is coupled and provides power to the comparison circuitry 160 and the alerting circuitry 170. In an alternative embodiment, the power supply 190 is a battery; a battery-operated suppressing capacity circuit 150 has the advantage of easy portability, allowing a user to purchase only one testing apparatus that may be used with many transient-voltage protection devices such as device 100.

Figure 2:
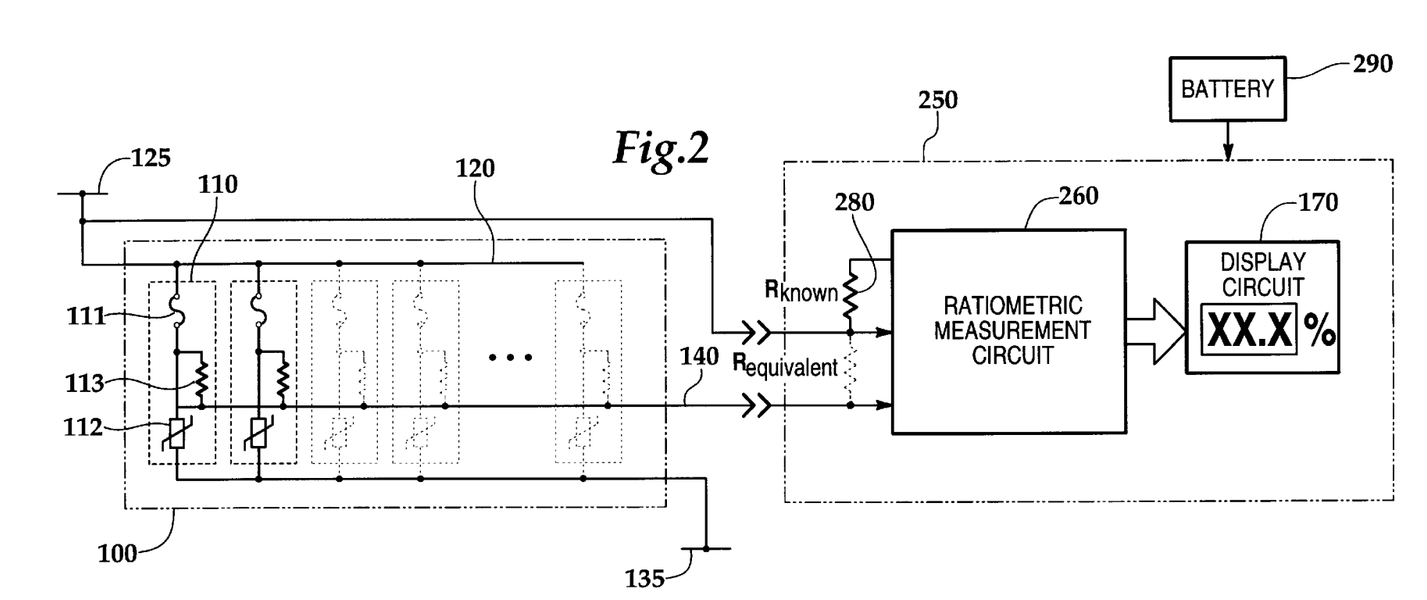
FIG. 2 illustrates an exemplary transient voltage protection device and a second exemplary embodiment of the suppressing capacity circuit in accordance with the principles of the present invention.

Turning now to FIG. 2, illustrated is an exemplary transient voltage protection device 100 and a second exemplary suppressing capacity circuit 250 in accordance with the principles of the present invention. The construction and principles of operation for the transient-voltage protection device 100 are discussed in detail hereinabove and will not be repeated with reference to FIG. 2. The exemplary suppressing capacity circuit 250 employs to advantage the equivalent resistance $R_{equivalent}$ (i.e., the "electrical characteristic") provided by the detection circuitry comprised of the resistors 113. In particular, the invention embodied in suppressing capacity circuit 250 is based on the recognition that the equivalent resistance $R_{equivalent}$ does not vary as a function of the voltage between the first and second electrical conductors 125, 135. Furthermore, the value of the equivalent resistance $R_{equivalent}$ can be measured regardless of whether electrical power is applied to the transient-voltage protection device 100 and, in particular, the equivalent resistance $R_{equivalent}$ of a transient-voltage protection device 100 coupled between the neutral and ground conductors of a power distribution system can be measured; in contrast, prior art status monitoring circuits relied on electrical power applied to the transient-suppressing device to power a status indicator and, thus, could not indicate the status of a device coupled between neutral and ground conductors.

As with the suppressing capacity circuit 150, the suppressing capacity circuit 250 further includes a source of power 290, which provides power to the ratiometric circuitry 260 and the alerting circuitry 170. In the embodiment illustrated in FIG. 2, the source of power 290 is a battery; a battery operated suppressing capacity circuit 250 has the advantage of easy portability, allowing a user to purchase only one testing apparatus that may be used with many transient-voltage protection devices.

In the exemplary embodiment illustrated in FIG. 2, the suppressing capacity circuit 250 employs a ratiometric measurement circuit 260, which is a type of comparison circuit. Typically, in a ratiometric operation, an unknown resistance, e.g., the equivalent resistance $R_{equivalent}$, is measured with respect to a known standard resistance, i.e., a resistor having a known value 280 ("$R_{known}$"); an accurately-defined reference voltage is not required. The equivalent resistance $R_{equivalent}$ is placed in series with the resistor $R_{known}$ 280 and a current is passed through the pair; the voltage developed across the equivalent resistance $R_{equivalent}$ is compared with the voltage across the resistor $R_{known}$ 280; if the voltages are equal, then the resistance of the equivalent resistance $R_{equivalent}$ is equal to the resistance $R_{known}$ 280.

In one embodiment, the value of the resistance $R_{known}$ 280 is selected to be equal to the value of the equivalent resistance $R_{equivalent}$ when none of the fuses 111 are open-circuited. When a fuse 111 open-circuits due to the failure of an MOV 112, the equivalent resistance $R_{equivalent}$ will no longer be equal to the value of the resistance $R_{known}$ 280; as additional fuses 111 open-circuit due to additional failures of MOVs 112, the equivalent resistance $R_{equivalent}$ will vary more and more from the value of the resistance $R_{known}$ 280.

Figure 3:
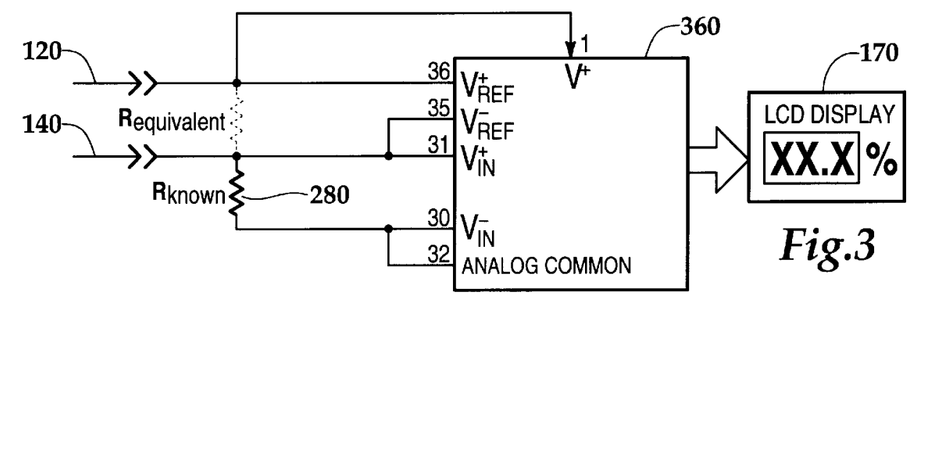
FIG. 3 illustrates an exemplary ratiometric measurement circuit that may be employed as a suppressing capacity circuit in accordance with the principles of the present invention.

Those skilled in the art are familiar with various ratiometric circuits; the principles of the present invention are not limited to a particular circuit, all such circuits being within the scope of the claims recited hereinafter. FIG. 3 illustrates a specific embodiment of the suppressing capacity circuit illustrated in FIG. 2, wherein the ratiometric measurement circuit employs a TC7106 analog-to-digital converter ("ADC") 360 manufactured by TelCom Semiconductor, Inc. of Mountain View, Calif. The TC7106 has a true differential input and a differential reference input that allow precise ratiometric measurements; the TC7106 can also produce an output signal suitable for driving an LCD display (i.e., alerting circuitry 170).

In a conventional application of the TC7106 ADC 360, a standard, or reference, resistor $R_{standard}$ is coupled to the reference inputs $V^+_{REF}$ (pin 36) and $V^-_{REF}$ (pin 35), and the unknown resistance $R_{unknown}$ is coupled to the $V^+_{IN}$ (pin 31) and $V^-_{IN}$ (pin 30) inputs. In this configuration, the output of the TC7106 ADC 360 can provide a displayed reading that can be determined from the following expression:

$$\text{Displayed reading} = \frac{R_{unknown}}{R_{standard}} \times 1000 \qquad (1)$$

Because the value of the equivalent resistance ($R_{equivalent}$) of the parallel combination of the resistors 113 will vary from some finite value to infinity as fuses 111 open-circuit, if $R_{equivalent}$ is used as $R_{unknown}$ (i.e., coupled to pins 30 and 31), then the displayed reading will increase as fuses open-circuit. In a preferred embodiment, however, it is desired that the display reading decrease from 100% to zero as the current-limiting elements, fuses 111, open-circuit.

In the specific embodiment illustrated in FIG. 3, the status conductor 140 is coupled to pin 35 and bus 120 is electrically-coupled to pin 36 of the TC7106 ADC 360; i.e., the equivalent resistance $R_{equivalent}$ is coupled to the reference input of the TC7106 ADC 360. A resistor having a known value $R_{known}$ 280 is coupled to the $V^+_{IN}$ (pin 31) and $V^-_{IN}$ (pin 30) inputs. In this configuration, the output of the TC7106 ADC 360 can provide a displayed reading that can be determined from the following expression:

$$\text{Displayed reading} = \frac{R_{known}}{R_{equivalent}} \times 10000 \qquad (2)$$

Because $R_{known}$ has a fixed finite value and $R_{equivalent}$ will vary from some finite value to infinity as fuses 111 open-circuit, then the displayed reading will decrease as fuses open-circuit; i.e., as the value of $R_{equivalent}$ approaches infinity, the displayed reading approaches a value of zero. If the resistance $R_{known}$ 280 is selected to have a value one-tenth of the value of the equivalent resistance $R_{equivalent}$ when none of the fuses 111 are open-circuited, then the maximum display reading will be equal to 100; e.g., 1 MΩ/10 MΩ times 1000 equals 100. As the equivalent resistance $R_{equivalent}$ increases, due to the open-circuiting of fuses 111 associated with the failure of MOVs 112, the display reading will decrease in proportion to the number of failed MOVs; when the equivalent resistance $R_{equivalent}$ is equal to infinity (i.e., when all of the fuses 111 have open-circuited), the display reading will be zero; e.g., 1 MΩ/∞MΩ times 1000 is substantially equal to zero. Thus, the ratiometric circuit 360 can provide a signal to the alerting circuit 170 whereby a user can be informed of the remaining suppressing capacity of the transient-voltage protection device 100 from 100% down to zero percent; in contrast, prior art circuits have only been capable of displaying a single absolute reading based on some preselected condition.

Figure 4:
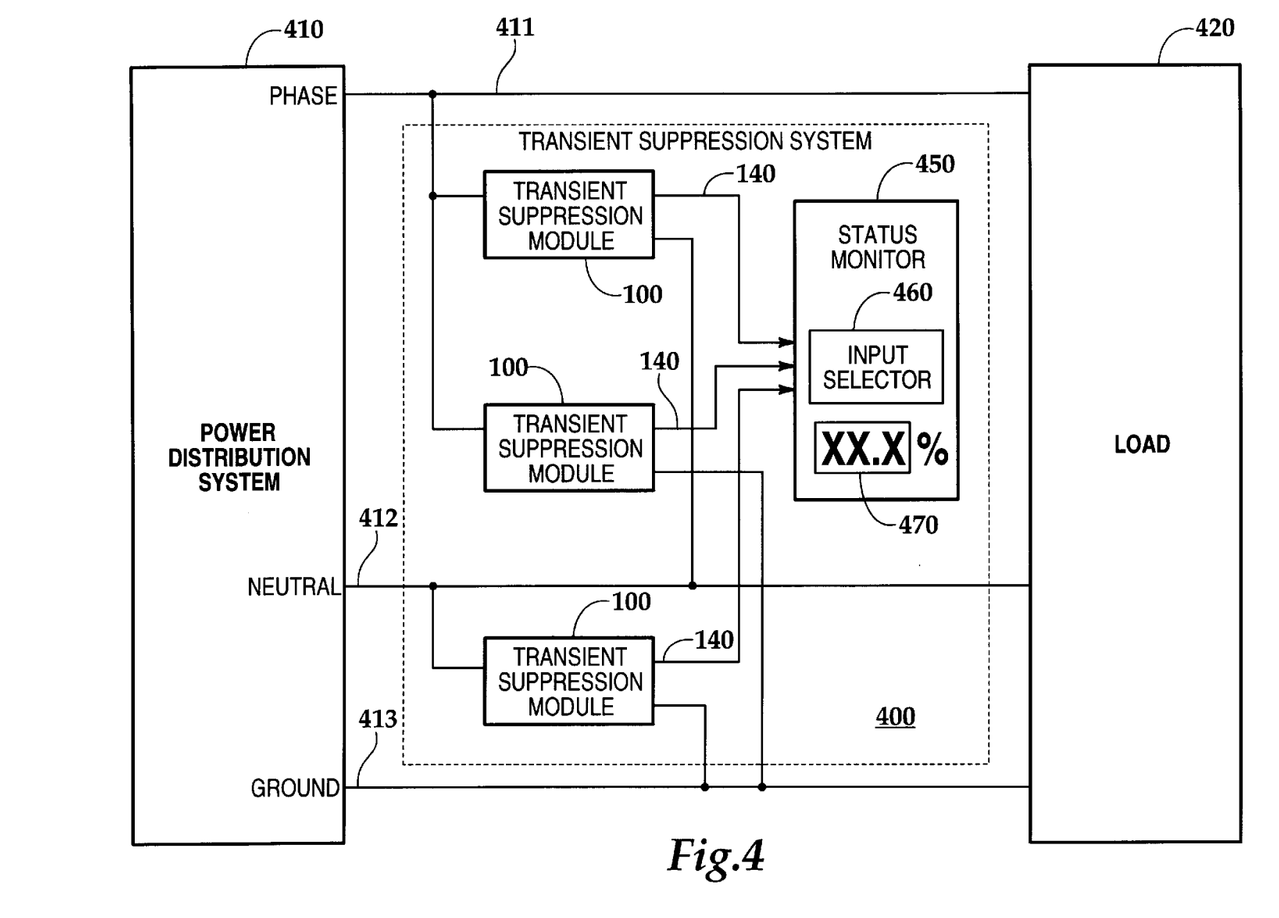
FIG. 4 illustrates a block schematic of a modular transient voltage protection system for suppressing all modes of transient voltages in a power distribution system, including a suppressing capacity circuit for determining the remaining suppressing capacity for all modes of the system.

Turning now to FIG. 4, illustrated is a block schematic of an exemplary modular transient-voltage protection system 400 for suppressing all modes of transient voltages in a power distribution system 410; the power distribution system provides power to an electrical load 420 via electrical conductors 411, 412, and 413; the electrical load 420 may be any type of residential, commercial or industrial electrical apparatus for which transient voltage protection is desired. In one embodiment, the electrical conductors 411, 412, and 413 are phase, neutral, and ground conductors, respectively. Those skilled in the art will understand that the transient suppression system 400 may include any number of transient-voltage suppressing devices, generally designated 100, to suppress transient voltages between any or all pairs of electrical conductors in a power distribution system, including single-phase, split-phase, and three-phase systems, with or without a ground conductor. In all such transient suppressing systems, a transient-voltage protection device 100, as described hereinabove, is coupled between any pair of conductors; i.e., phase-to-phase, phase-to-neutral, phase-to-ground, and neutral-to-ground.

The transient-voltage protection system 400 further includes a status monitor 450 that employs a suppressing capacity circuit as disclosed hereinabove, for determining the remaining suppressing capacity for all modes of the modular transient-voltage protection system 400. The status conductors, generally designated 140, of each of the transient-voltage suppressing devices 100 is coupled to the status monitor 140; in one embodiment, the status monitor 450 includes an input selector 460 that can be used to select which status conductor 140 is coupled to the suppressing capacity circuit, thereby requiring only one suppressing capacity circuit; the suppressing capacity circuit provides an indication via display 470 of the remaining suppressing capacity for the selected transient-voltage suppressing device 100. The input selector 460 may be operated either manually or automatically by a control circuit. If a control circuit is used to select the input, separate display circuits 470 may be employed for each transient-voltage suppressing device 100; a sample-and-hold circuit, or an equivalent thereof, can be used to store the remaining suppressing capacity value for each transient-voltage suppressing device 100, whereby each display 470 can continually indicate the remaining capacity of its associated device even when the status conductor 140 for the device is not selected by the input selector 460.

From the foregoing detailed description, it is apparent that the present invention provides a suppressing capacity circuit, and method thereof, for use with a transient voltage protection device, and devices and systems employing the suppressing capacity circuit and method. The transient-voltage protection device includes a plurality of series-coupled current-limiting elements and transient-suppressing elements couplable between first and second electrical conductors to suppress transient voltages therebetween, the current-limiting elements being adapted to open-circuit upon the failure of a transient-suppressing element coupled in series therewith. The suppressing capacity circuit includes: detection circuitry, coupled to each of the series-coupled current-limiting elements and transient-suppressing elements, that individually senses the open-circuit status of each of the current-limiting elements and provides an electrical characteristic that is a function of the number of the current-limiting elements which have not open-circuited; comparison circuitry, coupled to the detection circuitry, that compares the electrical characteristic to a reference and generates a signal that is a function of the ratio of the electrical characteristic to the reference; and alerting circuitry, coupled to the comparison circuitry, that receives the signal generated by the comparison circuitry and provides an indication of the ratio, the remaining suppressing capacity of the transient-voltage protection device being a function of the ratio.

Although the present invention and its advantages have been described in detail, those skilled in the art should understand that they can make various changes, substitutions and alterations herein without departing from the spirit and scope of the invention in its broadest form.

What is claimed is:

1. A suppressing capacity circuit for use with a transient voltage protection device, said transient voltage protection device including a plurality of series-coupled current-limiting elements and transient-suppressing elements couplable between first and second electrical conductors to suppress transient voltages therebetween, said current-limiting elements adapted to open-circuit upon the failure of a transient-suppressing element coupled in series therewith, said suppressing capacity circuit comprising:

detection circuitry, coupled to each of said series-coupled current-limiting elements and transient-suppressing elements, that individually senses the open-circuit status of each of said current-limiting elements and provides an electrical characteristic that is a function of the number of said current-limiting elements which have not open-circuited;

a reference resistor coupled to said detection circuitry and having a reference characteristic associated therewith;

comparison circuitry, coupled to said detection circuitry and said reference resistor, that compares said electrical characteristic to said reference characteristic and generates a signal that is a function of the ratio of said electrical characteristic to said reference characteristic; and alerting circuitry, coupled to said comparison circuitry, that receives said signal and provides an indication of said ratio, the remaining suppressing capacity of said transient voltage protection device being a function of said ratio.

2. The suppressing capacity circuit as recited in claim 1 wherein said detection circuitry comprises a plurality of resistors having first and second terminals, said first terminal of each resistor being coupled intermediate to one of said series-coupled current-limiting elements and said transient-suppressing elements, said second terminals of each of said plurality of resistors being coupled together to form a common node.

3. The suppressing capacity circuit as recited in claim 2 wherein said electrical characteristic provided by said detection circuitry is a voltage between said first electrical conductor and said common node and said reference characteristic is a voltage across said reference resistor.

4. The suppressing capacity circuit as recited in claim 2 wherein said electrical characteristic provided by said detection circuitry is a function of the resistance between said first electrical conductor and said common node and said reference characteristic is a function of the resistance value of said reference resistor.

5. The suppressing capacity circuit as recited in claim 1 wherein said comparison circuitry comprises a ratiometric circuit.

6. The suppressing capacity circuit as recited in claim 1 wherein said transient-suppressing elements each comprise a metal oxide varistor (MOV).

7. The suppressing capacity circuit as recited in claim 1 wherein said current-limiting elements each comprise a fuse.

8. The suppressing capacity circuit as recited in claim 1 wherein said alerting circuitry comprises display circuitry, said display circuitry adapted to provide a visual indication of said ratio, said remaining suppressing capacity of said transient voltage protection device being a function of said ratio.

9. The suppressing capacity circuit as recited in claim 8 wherein said display circuitry comprises a liquid crystal display (LCD), said visual indication being a percentage reading that is a function of said ratio of said electrical characteristic to said reference.

10. The suppressing capacity circuit as recited in claim 1 further comprising an isolated power supply, said isolated power supply electrically-isolated from said first and second electrical conductors and providing power to said comparison circuitry and said alerting circuitry.

11. The suppressing capacity circuit as recited in claim 10 wherein said isolated power supply is a battery.

12. A method for providing a relative indication of the remaining suppressing capacity of a transient voltage protection device, said transient voltage protection device including a plurality of series-coupled current-limiting elements and transient-suppressing elements couplable between first and second electrical conductors to suppress transient voltages therebetween, said current-limiting elements adapted to open-circuit upon the failure of a transient-suppressing element coupled in series therewith, said method comprising the steps of:

detecting the open-circuit status of each of said current-limiting elements;

providing an electrical characteristic that is a function of the number of said current-limiting elements which have not open-circuited;

comparing said electrical characteristic to a reference characteristic associated with a reference resistor;

generating a signal that is a function of the ratio of said electrical characteristic to said reference characteristic; and indicating from said signal said ratio, said remaining suppressing capacity of said transient voltage protection device being a function of said ratio.

13. The method as recited in claim 12 wherein said transient voltage protection device further includes a plurality of resistors having first and second terminals, said first terminal of each resistor being coupled intermediate to one of said series-coupled current-limiting elements and said transient-suppressing elements, said second terminals of each of said plurality of resistors being coupled together to form a common node.

14. The method as recited in claim 13 wherein said electrical characteristic is a voltage between said first electrical conductor and said common node, said step of providing comprising the step of measuring said voltage.

15. The method as recited in claim 13 wherein said reference characteristic is a voltage across said reference resistor said method further comprising the step of measuring said voltage across said reference resistor.

16. The method as recited in claim 13 wherein said electrical characteristic is the resistance between said first electrical conductor and said common node and wherein said step of providing comprises the step of measuring said resistance.

17. The method as recited in claim 12 wherein said reference characteristic is a function of the resistance value of said reference resistor.

18. The method as recited in claim 12 wherein said transient-suppressing elements each comprise a metal oxide varistor (MOV).

19. The method as recited in claim 12 wherein said current-limiting devices each comprise a fuse.

20. The method as recited in claim 12 wherein said step of indicating comprises the step of providing a visual indication of said ratio, said remaining suppressing capacity of said transient voltage protection device being a function of said ratio.

21. The method as recited in claim 20 wherein said visual indication is a percentage reading that is a function of said ratio of said electrical characteristic to said reference.

22. A transient voltage protection system for suppressing transient voltages occurring on any pair of a plurality of electrical conductors, said system comprising:

a plurality of transient suppressing modules, each of said modules couplable between first and second ones of said plurality of electrical conductors, each of said modules including:

a plurality of series-coupled current-limiting elements and transient-suppressing elements, said current-limiting elements adapted to open-circuit upon the failure of a transient-suppressing element coupled in series therewith; and detection circuitry, coupled to each of said series-coupled current-limiting elements and transient-suppressing elements, that individually senses the open-circuit status of each of said current-limiting elements and provides an electrical characteristic that is a function of the number of said current-limiting elements which have not open-circuited;

a reference resistor couplable to said detection circuitry and having a reference characteristic associated therewith;

comparison circuitry, couplable to said detection circuitry in each of said plurality of modules and said reference resistor, that compares said electrical characteristic to said reference characteristic and generates a signal that is a function of the ratio of said electrical characteristic to said reference characteristic; and alerting circuitry, coupled to said comparison circuitry, that receives said signal and provides an indication of said ratio, the remaining suppressing capacity of each of said transient voltage protection modules being a function of said ratio.

23. The transient voltage protection system as recited in claim 22 wherein said detection circuitry comprises a plurality of resistors having first and second terminals, said first terminal of each resistor being coupled intermediate to one of said series-coupled current-limiting elements and said transient-suppressing elements, said second terminals of each of said plurality of resistors being coupled together to form a common node.

24. The transient voltage protection system as recited in claim 23 wherein said electrical characteristic provided by said detection circuitry is a voltage between said first electrical conductor and said common node and said reference characteristic is a voltage across said reference resistor.

25. The transient voltage protection system as recited in claim 23 wherein said electrical characteristic provided by said detection circuitry is a function of the resistance between said first electrical conductor and said common node and said reference characteristic is a function of the resistance value of said reference resistor.

26. The transient voltage protection system as recited in claim 22 wherein said comparison circuitry comprises a ratiometric circuit.

27. The transient voltage protection system as recited in claim 22 wherein said transient-suppressing elements each comprise a metal oxide varistor (MOV).

28. The transient voltage protection system as recited in claim 22 wherein said current-limiting elements each comprise a fuse.

29. The transient voltage protection system as recited in claim 22 wherein said alerting circuitry comprises display circuitry, said display circuitry adapted to provide a visual indication of said ratio, said remaining suppressing capacity of each of said transient voltage protection modules being a function of said ratio.

30. The transient voltage protection system as recited in claim 29 wherein said display circuitry comprises a liquid crystal display (LCD), said visual indication being a percentage reading that is a function of said ratio of said electrical characteristic to said reference.

31. The transient voltage protection system as recited in claim 22 further comprising an isolated power supply, said isolated power supply electrically-isolated from said plurality of electrical conductors and providing power to said comparison circuitry and said alerting circuitry.

32. The transient voltage protection system as recited in claim 31 wherein said isolated power supply is a battery.

33. A suppressing capacity testing apparatus adapted to determine the remaining suppressing capacity of a transient voltage protection device, said transient voltage protection device including a plurality of series-coupled current-limiting elements and transient-suppressing elements couplable between first and second electrical conductors to suppress transient voltages therebetween, said current-limiting elements adapted to open-circuit upon the failure of a transient-suppressing element coupled in series therewith, and detection circuitry, coupled to each of said series-coupled current-limiting elements and transient-suppressing elements, that individually senses the open-circuit status of each of said current-limiting elements and provides an electrical characteristic that is a function of the number of said current-limiting elements which have not open-circuited, said suppressing capacity testing apparatus comprising:

comparison circuitry, couplable to said detection circuitry and a reference resistor having a reference characteristic associated therewith, that compares said electrical characteristic to said reference characteristic and generates a signal that is a function of the ratio of said electrical characteristic to said reference characteristic; and alerting circuitry, coupled to said comparison circuitry, that receives said signal and provides an indication of said ratio, the remaining suppressing capacity of said transient voltage protection device being a function of said ratio.

34. The suppressing capacity testing apparatus as recited in claim 33 wherein said detection circuitry comprises a plurality of resistors having first and second terminals, said first terminal of each resistor being coupled intermediate to one of said series-coupled current-limiting elements and said transient-suppressing elements, said second terminals of each of said plurality of resistors being coupled together to form a common node.

35. The suppressing capacity testing apparatus as recited in claim 34 wherein said electrical characteristic provided by said detection circuitry is a voltage between said first electrical conductor and said common node and said reference characteristic is a voltage across said reference resistor.

36. The suppressing capacity testing apparatus as recited in claim 33 wherein said electrical characteristic provided by said detection circuitry is a function of the resistance between said first electrical conductor and said common node and said reference characteristic is a function of the resistance value of said reference resistor.

37. The suppressing capacity testing apparatus as recited in claim 33 wherein said comparison circuitry comprises a ratiometric circuit.

38. The suppressing capacity testing apparatus as recited in claim 33 wherein said transient-suppressing elements each comprise a metal oxide varistor (MOV).

39. The suppressing capacity testing apparatus as recited in claim 33 wherein said current-limiting elements each comprise a fuse.

40. The suppressing capacity testing apparatus as recited in claim 33 wherein said alerting circuitry comprises display circuitry, said display circuitry adapted to provide a visual indication of said ratio, said remaining suppressing capacity of said transient voltage protection device being a function of said ratio.

41. The suppressing capacity testing apparatus as recited in claim 33 wherein said display circuitry comprises a liquid crystal display (LCD), said visual indication being a percentage reading that is a function of said ratio of said electrical characteristic to said reference.

42. The suppressing capacity testing apparatus as recited in claim 33 further comprising an isolated power supply, said isolated power supply electrically-isolated from said first and second electrical conductors and providing power to said comparison circuitry and said alerting circuitry.

43. The suppressing capacity testing apparatus as recited in claim 42 wherein said isolated power supply is a battery.

44. The suppressing capacity testing apparatus as recited in claim 33 wherein said apparatus is portable.

45. A transient voltage protection system, couplable between first and second electrical conductors to suppress transient voltages therebetween, said system comprising:

a plurality of series-coupled current-limiting elements and transient-suppressing elements, coupled to said first and second electrical conductors, said current-limiting elements adapted to open-circuit upon the failure of a transient-suppressing element coupled in series therewith; and a suppressing capacity circuit, for indicating the remaining suppressing capacity of said transient voltage protection system, said suppressing capacity circuit including:

detection circuitry, coupled to each of said series-coupled current-limiting elements and transient-suppressing elements, that individually senses the open-circuit status of each of said current-limiting elements and provides an electrical characteristic that is a function of the number of said current-limiting elements which have not open-circuited;

a reference resistor coupled to said detection circuitry and having a reference characteristic associated therewith;

comparison circuitry, coupled to said detection circuitry and said reference resistor, that compares said electrical characteristic to said reference characteristic and generates a signal that is a function of the ratio of said electrical characteristic to said reference characteristic; and alerting circuitry, coupled to said comparison circuitry, that receives said signal and provides an indication of said ratio, the remaining suppressing capacity of said transient voltage protection system being a function of said ratio.

46. The transient voltage protection system as recited in claim 45 wherein said detection circuitry comprises a plurality of resistors having first and second terminals, said first terminal of each resistor being coupled intermediate to one of said series-coupled current-limiting elements and said transient-suppressing elements, said second terminals of each of said plurality of resistors being coupled together to form a common node.

47. The transient voltage protection system as recited in claim 46 wherein said electrical characteristic provided by said detection circuitry is a voltage between said first electrical conductor and said common node and said reference characteristic is a voltage across said reference resistor.

48. The transient voltage protection system as recited in claim 46 wherein said electrical characteristic provided by said detection circuitry is a function of the resistance between said first electrical conductor and said common node and said reference characteristic is a function of the resistance value of said reference resistor.

49. The transient voltage protection system as recited in claim 45 wherein said comparison circuitry comprises a ratiometric circuit.

50. The transient voltage protection system as recited in claim 45 wherein said transient-suppressing elements each comprise a metal oxide varistor (MOV).

51. The transient voltage protection system as recited in claim 45 wherein said current-limiting elements each comprise a fuse.

52. The transient voltage protection system as recited in claim 45 wherein said alerting circuitry comprises display circuitry, said display circuitry adapted to provide a visual indication of said ratio, said remaining suppressing capacity of said transient voltage protection device being a function of said ratio.

53. The transient voltage protection system as recited in claim 52 wherein said display circuitry comprises a liquid crystal display (LCD), said visual indication being a percentage reading that is a function of said ratio of said electrical characteristic to said reference.

54. The suppressing capacity circuit as recited in claim 45 further comprising an isolated power supply, said isolated power supply electrically-isolated from said first and second electrical conductors and providing power to said comparison circuitry and said alerting circuitry.

55. The transient voltage protection system as recited in claim 54 wherein said isolated power supply is a battery.

* * * * *